United States Patent [19]

Nomura

[11] Patent Number: 5,371,678
[45] Date of Patent: Dec. 6, 1994

[54] SYSTEM AND METHOD FOR NAVIGATING VEHICLE ALONG SET ROUTE OF TRAVEL

[75] Inventor: Takashi Nomura, Kanagawa, Japan

[73] Assignee: Nissan Motor Co., Ltd., Yokohama, Japan

[21] Appl. No.: 795,592

[22] Filed: Nov. 21, 1991

[30] Foreign Application Priority Data

Nov. 22, 1990 [JP] Japan .................. 2-315900

[51] Int. Cl.$^5$ ............................... G06F 15/50
[52] U.S. Cl. ................... 364/444; 364/436; 340/990; 340/995
[58] Field of Search .......... 364/449, 444, 436; 340/990, 995, 988

[56] References Cited

U.S. PATENT DOCUMENTS

| | | | |
|---|---|---|---|
| 4,570,227 | 2/1986 | Tachi et al. | 364/444 |
| 4,758,959 | 6/1988 | Thoone et al. | 364/454 |
| 4,763,270 | 8/1988 | Itoh et al. | 364/449 |
| 4,774,671 | 9/1988 | Itoh et al. | 364/449 |
| 4,782,447 | 11/1988 | Ueno et al. | 364/449 |
| 4,796,189 | 1/1989 | Nakayama et al. | 364/449 |
| 4,926,336 | 5/1990 | Yamada | 364/444 |
| 5,036,477 | 7/1991 | Tamura et al. | 364/449 |
| 5,041,983 | 8/1991 | Nakahara et al. | 364/449 |
| 5,164,904 | 11/1992 | Summer | 364/436 |
| 5,168,452 | 12/1992 | Yamada et al. | 364/444 |
| 5,177,685 | 1/1993 | Davis et al. | 364/443 |
| 5,184,123 | 2/1993 | Bremer et al. | 340/995 |

FOREIGN PATENT DOCUMENTS

1-130299 5/1989 Japan.

Primary Examiner—Thomas G. Black
Assistant Examiner—Tan Q. Nguyen
Attorney, Agent, or Firm—Lowe, Price, LeBlanc & Becker

[57] ABSTRACT

A system and method for navigating a vehicle along a route of travel are disclosed in which a plurality of routes present between a point of start of the vehicle and a destination are a plurality of road segments divided for respective branching points provided in midways through the plurality of routes of travel are stored in storage areas of a memory in a control unit together with information related to the plurality of road segments. The control unit of the guidance system calculates a predicted time at which the vehicle is to pass through each of the plurality of road segments on the basis of information stored in the storage areas. An optimum route of travel from the starting point to the destination is set according to the result of a calculation of the least predicted time. Hence, even if a traffic limitation time band is provided on the set route of travel due to various types of traffic passage limitations, such an external factor of disturbance is input and stored in the storage areas so that an appropriate route of travel can be searched from the information stored in the storage areas. During the vehicle run on the set route of travel, the appropriate searching for the set route of travel can be made in the midway through the set route of travel according to a presence in a temporary limitation or traffic jam.

5 Claims, 5 Drawing Sheets

SYSTEM AND METHOD FOR NAVIGATING VEHICLE ALONG SET ROUTE OF TRAVEL

BACKGROUND OF THE INVENTION (1) Field of the Invention

The present invention relates to a system and method for navigating a vehicle along a set route of travel in which an optimum route of travel from a starting point of the vehicle to a destination can be set.

(2) Description of the Background Art

Recently, various types of, so-called, navigation systems have been proposed in which a present position of the vehicle is sequentially derived on the basis of a direction information generated from a vehicular direction sensor and a distance information generated from a running distance sensor and the derived vehicular position is continuously displayed on a displayed road map.

A Japanese Patent Application First Publication No. Heisei 1-130299 published on May 23, 1989 exemplifies a previously proposed vehicular navigation system.

In the disclosed navigation system, such inherent characteristic data as a running distance, a time it takes for the vehicle to reach a destination, and a charge required for the vehicle to reach the destination is stored in a memory together with a regional road map data. It is herein noted that a position of an intersection or a branched road point in a road network is hereinafter referred to as a node.

The inherent characteristic data described above will specifically be explained below.

For example, in a first road region, the inherent characteristic data of a route from a first node to a fifth node via a third node are displayed aside a displayed regional road map having a plurality of nodes on a television screen. In a second road region, the inherent characteristic data of another route from the first node to the fifth node via a fourth node are displayed on the same screen. In a third road region, the inherent characteristic data of another route from the first node to the fifth node via the second and fourth nodes.

In the disclosed navigation system, when an arbitrary starting point and arbitrary destination are plotted, respectively, the inherent characteristic data are referred to so that a single route is calculated providing a shortest distance from the point of start to the destination, a single route is calculated providing a shortest required time, and a single route is calculated providing a least cost of travel, respectively.

A method for searching one of the routes on which the vehicle is to run from a road map data includes, e.g., a, so-called, dikisutora method in which a shortest distance between a plurality of road points is sequentially derived to search the vehicle running route.

In the previously proposed searching method utilizing the dikisutora method, the road network data of a district in which the vehicular starting point and the destination are placed, i.e., the position data on the intersections and the data on road segments connected to the respective intersections are referred to and, in addition to these data, the inherent characteristic data are referred to as well to determine an optimum route of travel from the start point to the destination. At this time, such a series of processings as described above are executed without consideration of pass time upon vehicle's start from the starting point and change in the running condition of the vehicle.

In the previously proposed searching method, even in a case where one of the road segments on which a passage of vehicle is limited or prohibited is present on the set route of travel, the series of processings related to the search for the optimum rouge are executed without a predicted time at which the vehicle is to pass through the road segment(s) on which the passage of vehicle is limited taken into consideration.

Therefore, in a case where the search for the optimum route including the search for the road segment(s) on which a traffic limitation is carried out for a specified time duration is executed, an appropriate determination of the route of travel and an optimum search for the route of travel on which the vehicle reaches the destination becomes difficult.

In addition, since, in the previously proposed searching method, a time difference between a time at which the vehicle has actually passed through an arbitrary point of location and a predicted time at which the vehicle is to pass through the arbitrary point of location in a running scheme is not considered and such a series of search processings as described above are executed, an appropriate determination on the road segment(s) on which the traffic limitation is carried out cannot be made and the search for the optimum route according to the change in the running condition of the vehicle becomes difficult.

Furthermore, since, in the previously proposed searching method, a recalculation of such a inherent characteristic data as the running distance and so on as recited above needs to be repeated so that the processing time becomes long. Consequently, the searching for the optimum route of travel becomes difficult in a very short period of time.

SUMMARY OF THE INVENTION

It is, therefore, an object of the present invention to provide a system and method for navigating a vehicle along a route of travel which are capable of searching various routes of travel according to a time at which the vehicle is to start even though a road segment on which a limit of vehicle passage during a specified time band is present is located along the various routes of travel from the start point to the destination and which are capable of searching an appropriate route of travel according to a presence of a temporary limit of vehicular passage or traffic jam on the road segment through which the vehicle is to pass, when the vehicle is running on the set route of travel toward the destination.

It is another object of the present invention to provide a system and method for navigating a vehicle along a route of travel which are capable of searching a most appropriate route of travel according to a change in the running condition of the vehicle.

It is still another object of the present invention to provide a system and method for navigating a vehicle along a route of travel which are capable of searching a most appropriate route of travel in a very short period of time during a processing of change in the set route of travel.

These objects can be achieved by providing a system for navigating a vehicle along a route of travel, comprising: a) first means having a storage area in which a plurality of routes along which the vehicle can travel from a point of start to a point of destination, a plurality of road segments on the plurality of routes divided for respective nodes present on the plurality of routes are stored together with a plurality of data representing characteristics inherent to the respective road segments: b) second means for calculating a predicted time at which the vehicle is to pass through each one of the road segments on a basis of information on each one of the road segments stored in the first means; and c) third means for setting one of the routes of travel from the points of start to the destination according to the result of calculation by means of the second means.

These objects can also be achieved by providing a method for navigating a vehicle along a route of travel, comprising the steps of: a) setting a point of start of the vehicle and a destination on a regional road map; b) searching a plurality of routes through which the vehicle is to pass from the point of start to the destination from a storage area in which the plurality of routes, a plurality of road segments divided for respective nodes present on the plurality of routes are stored together with a plurality of data representing characteristics inherent to the respective road segments; c) calculating a predicted time at which the vehicle is to pass from one node to another node through each one of the road segments on the basis of the information stored in the storage area; and b) setting an optimum route of travel from the point of start to the destination according to the result of calculation in the step c).

DETAILED DESCRIPTION OF THE PREFERRED EMBODIMENT

Reference will hereinafter be made to the drawings in order to facilitate a better understanding of the present invention.

Figure 1:
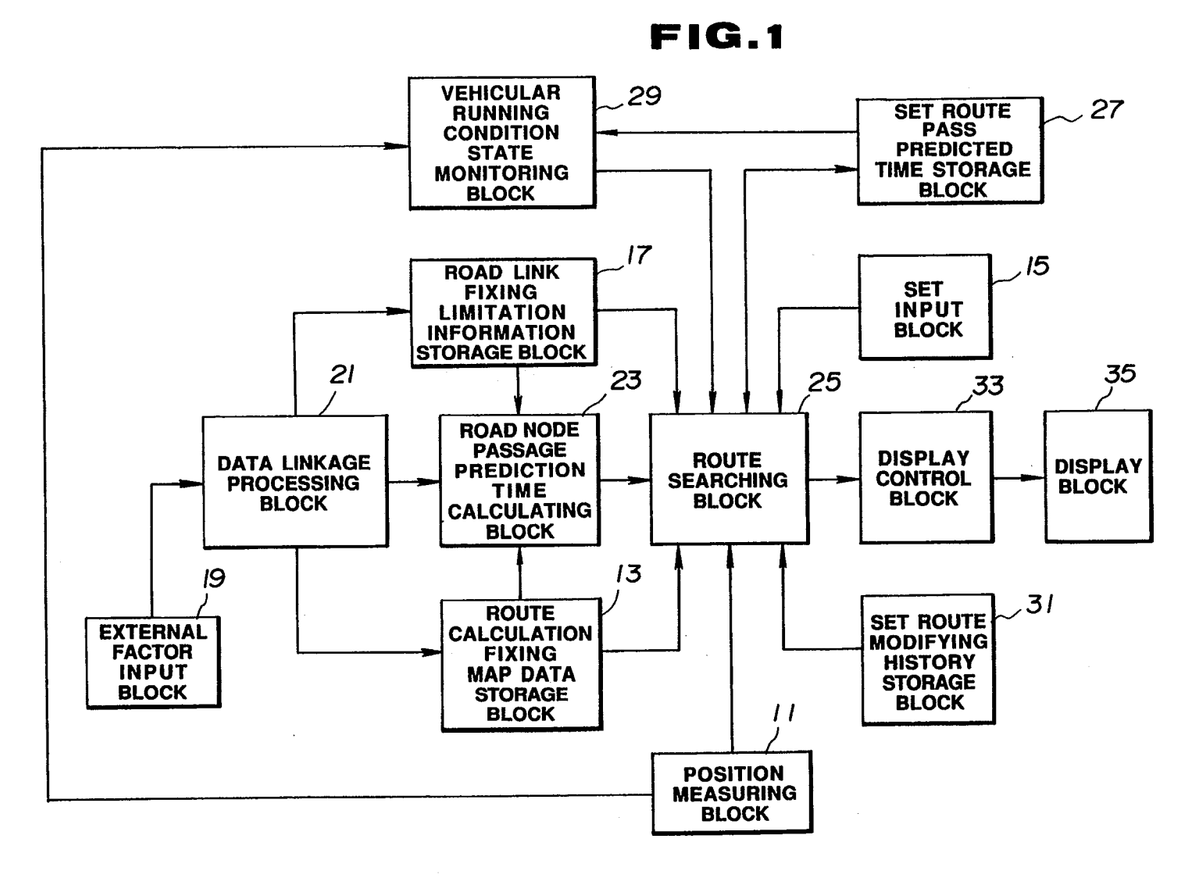
FIG. 1 is a functional block diagram of a preferred embodiment of a system for navigating a vehicle along a route of travel according to the present invention.

FIG. 1 shows a basic functional structure of a vehicular navigating system of a preferred embodiment according to the present invention.

Figure 2:
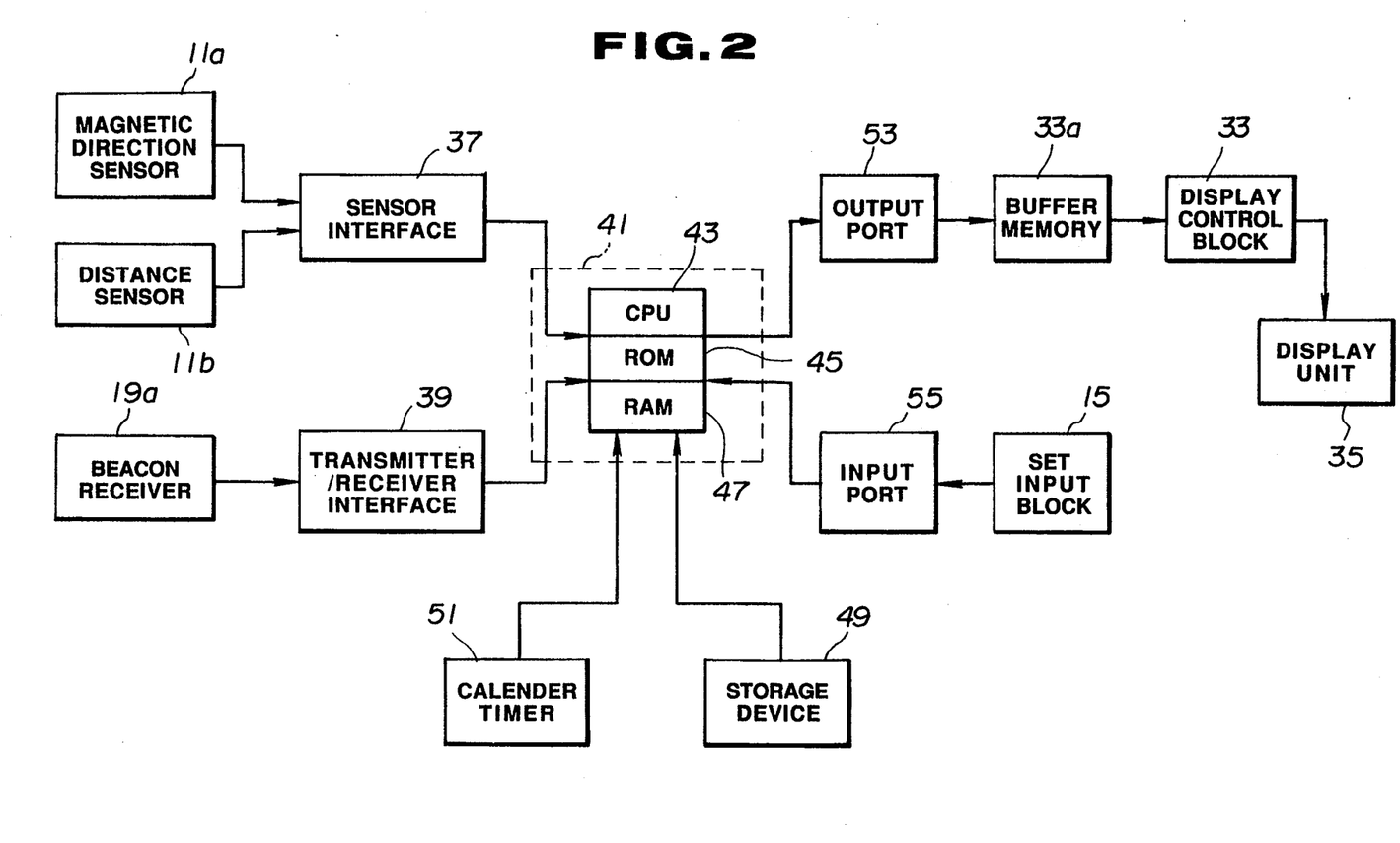
FIG. 2 is a specific circuit block diagram of the preferred embodiment of the vehicular navigating system along the route of travel shown in FIG. 1 according to the present invention.

FIG. 2 shows a specific circuit block diagram of the vehicular navigating system in the preferred embodiment shown in FIG. 1.

A position measuring block 11 includes a magnetic direction sensor 11a, a distance sensor 11b, sensor interface (hereinafter, referred simply to as an interface) 37, and control unit 41. The position measuring block 11 calculates a vehicular position on a two-dimensional coordinate system on the basis of a vehicular direction information derived from the vehicular direction sensor 11a and distance information derived from the distance sensor 11b.

A storage block 13 of a fixed regional road map for calculation of route of travel (hereinafter simply referred to as the storage block) serves to store the fixed regional road map data therein. That is to say, the fixed map data to be stored in the storage block 13 includes a plurality of road segments on a plurality of routes to be set, all of the roads being divided into a plurality of road segments between respective branching points (nodes) and run information on the respective road segments (intervals) and branching points (nodes).

Specifically, the storage block 13 stores the fixed road map data such as data on position coordinates on the intersections which are branching points, data on connections to adjacent intersections, distance data on the links which are segments between adjacent intersections, data on angles of links to be connected to the intersections, data on times required for the vehicle to run between the adjacent intersections, and data on a road network constituted by a plurality of links.

It is noted that the term "link" means one of the road segments connecting between one node (intersection) and another node.

In addition, identification information is added according to kinds of roads such as free ways, main roads, secondary roads, side roads, and unpaved roads.

A set input block 15 includes an operation board through which data on a point of start and a point of destination and an operation instruction unit through which a position of the vehicle is displayed.

A storage block 17 for a road link fixed limitation information (herein simply referred to as a storage block 17) stores various types of fixed limitation data such as a limitation data related to one way traffic, data related to inhibition of right and left turns, data related to keep off, and data on traffic limitation. To these limitation data, added is the information to identify a time of duration during which the traffic limitation is carried out, a day of a week during which it is carried out, and a day interval during which it is carried out.

An external factor input block 19 (hereinafter, simply referred to as an input block) includes a beacon receiver 19a, and a communicator interface 39 (hereinafter, referred simply to as an interface). The input block 19 inputs therein external environmental data including a time varying information such as a traffic limitation information, traffic jam information, traffic accident information, and road construction information.

A data link processing block (hereinafter, simply referred to as a calculating block) 21 serves to combine the external data input through the input block 19 with the fixed road map data of the storage block 13 or to combine them with the fixed limitation data in the storage block 17.

A calculation block 23 of a time of predicted passage through each road node (hereinafter, simply referred to as a calculation block) calculates a predicted time at which the vehicle would actually pass through each of road node virtually imaging a case where the vehicle actually runs on the basis of fixed road map data, fixed road limitation data, and so on read from the storage blocks 13 and 17. In the calculation block 23, such a traffic limitation information, traffic jam information, traffic accident information, road construction information as external data are combined with the fixed road map data. When they are combined with the fixed road map data in the storage block 17, the predicted time at which the vehicle is to pass through each node is calculated with such external data as described above taken into consideration.

A route searching block 25 serves to read the data from the storage blocks 13, 17 on a region to be subjected to be searched according to data on the points of start and destination input from the set input block 15 and to search the appropriate route of travel on the basis of read data. At this time, the route searching portion 25 searches the appropriate route of travel with the predicted time at which the vehicle is to pass through each node calculated by means of the calculation block 23 taken into account.

A storage block 27 for the predicted time at which the vehicle is to pass through a set route of travel (hereinafter, simply referred to as a storage block) stores data related to a predicted time at which the vehicle is to pass through each node to be searched according to a newest route of path searched by means of a route searching block 25.

A vehicle running condition monitoring block (hereinafter, simply referred to as a monitoring block) 29 includes a control unit 41 and a calendar timer 51 to be described later. The monitoring block 29 inputs a time information derived from the calendar timer 51 and data on the vehicular position derived from the position measuring block 11 and inputs data on the predicted time at which the vehicle is to pass through each node.

In addition, the monitoring block 29 stores data related to a running scheme previously set therein, i.e., data on a time interval of scheme of travel previously planned. The monitoring block 29 compares data related to the running scheme and data related to the predicted time at which the vehicle is to pass through each node so as to detect whether a change in running state related to run of the vehicle. The information from the monitoring block 29 is provided for the route searching block 25 so that the appropriate search of route can be made according to the change in the running condition related to the run of the vehicle.

A storage block 31 for a change history of set route of travel (hereinafter, simply referred to as a storage block) stores a change history data of the set route of travel such as a data on the changed link, change reason data which encodes the reason for change, and data related to the predicted time at which the vehicle is to pass through the changed node. Such change history data as described above are stored whenever the route of path is changed. Thereafter, the change history data are used when the new route of travel is searched by means of the route searching block 25.

Consequently, the search for the new route of travel by means of the route searching block 25 can be carried out in a very short period of time.

The display control block 33 carries out the display control over the display of data derived from the route searching block 25.

A display block 35 serves to display the searched route of travel from the point of start to the destination, corresponding regional road map, and vehicular position.

Next, the specific construction of the vehicular navigating system will be described with reference to FIG. 2.

The magnetic direction sensor 11a is connected to the control unit 41 via the interface 37 and the distance sensor 11b is connected to the control unit 41 via the interface 37. The geomagnetic sensor 11a detects a forward direction of the vehicle with respect to the geomagnetic North and outputs a direction information. The distance sensor 11b detects a running distance of the vehicle and outputs distance information.

The control unit 41 generally includes a CPU 43, ROM 45, and RAM 47. The control unit 41 functionally includes the calculation block 23, calculating means for calculating a predicted time at which the vehicle is to pass through the node which is provided in an interval between the adjacent branching points, and setting means for setting the route of travel from the point of start to the point of destination according to the result of calculation by the calculating block. In addition, the control unit 41 functionally includes the position measuring block 11, processing block 21, and monitoring block 29.

The beacon receiver 19a is connected to the control unit 41 via the interface 39. The beacon receiver 19a receives external data such as, e.g., the traffic limitation information, traffic jam information, traffic accident information, road construction information, and so on in a predetermined format. The predetermined format input to the beacon receiver 19a has a frame length of fixed 128 bytes including a transmission control portion, header portion, and real data portion. The received data are transmitted to the control unit 41 via the interface 39.

A memory device 49 includes storage blocks 13, 17.

The memory device 49 is connected to the control unit 41 which reads the data stored in the memory device 49.

The calendar timer 51 is connected to the control unit 41 and outputs a calendar information such as a date and day of week and a timer information such as a passed time from the time of start to the control unit 41.

The control unit 41 is connected to the display block 35 via an output port 53, a buffer memory 33a, and a display control block 33.

The control unit 41 is connected to the set input block 15 via an input port 55.

An operation of the vehicular navigating system will be described with reference to FIG. 3.

In a step S1, the start point and destination are set. That is to say, when the data on the point of start and destination are input, the route searching block 25 reads the corresponding fixed road map data from the storage block 13 to display the road map on the basis of the fixed road map data onto the display unit 35. The point of start and destination are set on the displayed road map.

In a step S3, the control unit 41, i.e., the route searching block 25 searches one of the routes of travel from the point of start to the destination.

In a step S5, the vehicular route is displayed on the road map.

In a step S7, the control unit 41 determines whether a traffic limitation link is present on the set route of travel. If no traffic limitation is present on the set route of travel, the routine goes to a step S9.

In a step S9, the control unit 41 determines whether the external data, i.e., any one of traffic limitation information, traffic accident information, traffic jam information, and road construction information is input from the beacon receiver 19a. The external data on the traffic limitation information, traffic accident information, traffic jam information, and road construction information can be identified according to the coded contents of a large classification ID provided in the header portion of the predetermined format received by the beacon receiver 19a.

Then, the control unit 41 waits until the external data is input. If the external data is input at a step S9, the routine enters a step S17.

If the traffic limitation link is present in the step S7, the routine goes to a step S11.

In the step S11, the control unit 41 calculates an error present between the actual pass time at which the vehicle has actually passed through the node now in travel and the predicted pass time at which the vehicle is to pass through the node on the basis of the previously set running scheme. The predicted time for each node based on the previously set running scheme is derived by the node pass predicted time calculating block 23 and route searching block 25 shown in FIG. 1. A method for calculating the predicted time at which the vehicle is to pass through each node is such as to label a shortest distance (derived by a normal route searching method) at each node. For example, a distance from the start point to an arbitrary node via a shortest course and a time during which the vehicle is to run from the start point to the arbitrary node via the shortest course. The comparison between the actual pass time and predicted pass time is specifically carried out in the vehicle running condition monitoring block 29 shown in FIG. 1. The vehicle running condition monitoring block 29 derives the time error utilizing the present position information derived from the position measuring block 11 and set route predicted pass time storage block 27. The vehicle running condition monitoring block 29 derives one of the nodes through which the vehicle is first to pass from the present position on the basis of the two pieces of information to determine the predicted pass time and calculates how degree of time errors are present between the actual running time and schemed value.

In a seep S13, the control unit 41 determines whether the external data, i.e., data such as any one of traffic limitation information, traffic jam information, traffic accident information, and road construction information is input. If the external data is input, the routine goes to a step S17.

On the other hand, if no external data is present, the routine goes from the step S13 to a step S15.

In the step S15, the time deviation, i.e., an error calculated between the actual pass time and the predicted pass time at which the vehicle is to pass on the basis of the previously set running scheme for the node at which the vehicle is first to pass from the present vehicle position is compared with limit values within which the error is permissible. Then, in the step S15, the control unit 41 determines whether the error, i.e., the time deviation is within the permissible range.

When, in the step S15, the time deviation is within the permissible range, the routine returns to the step S11 without change of the set route. Conversely, if the time deviation is out of the permissible range, the routine goes to a step S17 to change the presently set route of travel.

Specifically, in a case where the limitation time band t of the link subjected to the limitation on the route is within a time range, e.g., the passed time ta to tb from which the vehicle has started, i.e., $$ta < t < tb \qquad (1),$$

suppose that a passed time before the limitation time is t1 and the passed time t2 after the limitation time.

Respective permissible times TH1, TH2 are expressed in the following equations:

$$TH1 = ta - t1 \qquad (2)$$

$$TH2 = t2 - tb \qquad (3)$$

Hence, suppose that sequentially calculated actual pass times of nodes are Rt and the corresponding predicted times of passage through the nodes are Dt. The time error xt (time deviation) for each node can be expressed as follows;

$$xt = Rt - Dt \qquad (4).$$

When the following inequality is established in a case where the predicted pass time Dt is after the limitation time tb; $TH1 < xt$ - - - (5), the change in the route of travel becomes unnecessary since the pass time of the vehicle is out of the range of the traffic limitation time.

On the other hand, if the following inequality is established in a case where the predicted pass time Dt is after the limitation time $t_b$; $TH2 < -(xt)$ - - - (6), the time at which the vehicle is passed through the corresponding node is within the limit range of the limitation so that the change in the set route of travel becomes necessary.

In the step S17, the link is set again on the basis of the change history data stored in the set route change history data storage portion 31 so as to change the route of travel. Hence, in a case where the set route is changed, the stored change history data is used which has been stored during the processing related to the change in the route so that the more appropriate route of travel can be searched in a very short time.

Next, in a step S19, the control unit 41 determines whether the modification of all of the links required to be changed is completed.

If, in the step S19, the modification of all of the links is not completed, the routine goes to a step S21 to calculate the route of travel.

In a case where the control unit 41 determines that the modification of all of the links required to be changed is completed, the routine goes to a step S23.

In the step S23, the control unit 41 determines whether the updating of the route of travel along with the modification of the links should be continued.

If the control unit 41 determines that the updating of the route of travel should be continued, the routine returns to the step S5 via the step S25. Thus, the data related to the link changed at the steps S17 and S21 are stored in the storage block 31 and the operation related to the updating of the route is continued. In addition, if the end of updating the route is determined in the step S23, the processing related to the search of the set route of travel is ended.

A processing related to the route calculation of the step S3 shown in FIG. 3 will be described in details with reference to FIG. 4.

In a step S27, when the point of start and destination are set on the displayed road map on the display unit 35, a start intersection at which the vehicle placed at the point of start is first to pass is set as a center intersection.

Thereafter, the processing related to search for the set route of travel is advanced as will be described later, calculating the distance from the center intersection to the corresponding adjacent intersections and required time for the vehicle to run toward the node on the basis of the information on the adjacent intersections to the center intersection.

In addition, a time (,e.g., 8:00 AM, Aug. 1, 1991) at which the vehicle starts at the start intersection is set in the step S27.

In a step S29, a distance from the start intersection to each of all intersections adjacent to the start intersection is initially set as follows:

Distance variable L from the start intersection to the center intersection - - - 0

Distance variables L from the center intersection to all other intersections - - - ∞

In a step S31, the control unit 41 calculates the predicted pass time at which the vehicle is to pass through the center intersection.

In a step S33, the control unit 41 refers to data on the road link limitation which is the fixed limitation data of the link to be connected to the center intersection on the basis of the information on the center intersection.

In a step S35, the control unit 41 determines whether a limitation interval of time during which the vehicle cannot pass through the road segment is present between adjacent intersections with respect to the center intersection. In the step S35, in a case when the limitation interval of time is not present, the routine goes to a step S37 in which the following determination processing is executed.

That is to say, suppose that a total distance from the start intersection to the center intersection in the shortest course of travel is L1, the distance from the center intersection to one of the other intersections adjacent to the center intersection is L2, and the total distance from the start intersection to one of the intersections adjacent to the center intersection is L3. The control unit 41 determines whether the following inequality is established; L1+L2<L3 - - - (7).

As the result of determination in the step S37, the routine goes to a step S39 in a case where the above inequality is established.

In the step S39, the value of left side L1+L2 in the inequality (7) is set as the distance L3 from the start intersection to the adjacent intersection. In addition, as the result of determination in the step S37, the routine goes to a step S45 in a case when the inequality of (7) is not established.

On the other hand, in a case when the control unit 41 determines that the limitation interval of time on the road segment is present in the step S35, the routine goes to a step S41. In the step S41, the control unit 41 refers to the predicted pass time at which the vehicle is to pass through the road segment on which the limitation interval of time is present.

In the next step S41, the control unit 41 refers to the predicted time at which the vehicle is to pass through the road segment on which the limitation interval of time is present.

Next, in a step S43, the control unit 41 compares the limitation interval of time, i.e., limitation time interval of the traffic limit link and predicted pass time described above to detect whether the link is enabled for the vehicle to pass therethrough. When the control unit 41 determines that the link is enabled for the vehicle to pass, the routine goes to the step S37.

When the control unit 41 determines that the vehicle is enabled for the vehicle to pass through the link (road segment) in the step S43, the routine goes to a step S45.

In the step S45, the control unit 41 moves the center intersection to the next intersection. That is to say, the next intersection is set as the new center intersection.

In a step S47, in a case when the control unit 41 determines that the center intersection coincides with a final intersection, the processing related to the calculation of route of travel is ended.

Next, a detailed processing related to the calculation of the predicted time of pass at the step S31 shown in FIG. 4 will be described with reference to FIG. 5.

In a step S51, the control unit 41 refers to a required time for an average run on the basis of the fixed data, i.e., fixed road map data and fixed limitation data and calculates the predicted pass time of the link to be required. Next, in a step S53, the control unit 41 determines whether the external data from the input block 19, i.e., data on the traffic jam information are input. When the external data is input in the step S53, the routine goes to a step S55 in which the input data is referred to to convert it into the required time for the vehicle's run.

Next, in a step S57, the control unit 41 changes the predicted time of pass at which the vehicle is to pass through the link according to the required time for the vehicle run converted in the step S55.

In a case where the external data is not input at a step S53, the control unit 41 calculates a time error percentage related to a time series and distance in a step S59. Next, the control unit 41 calculates a predicted time band of pass through a center intersection utilizing the time error percentage in the step S61.

A detailed processing related to the reference to the road link limitation data in the step S33 shown in FIG. 4 will be described with reference to FIG. 6.

In a step S63, the control unit 41 receives the external data.

In a step S65, the control unit 41 determines whether the external data, i.e., traffic jam information and so on derived from the input block 19 are input.

If the control unit 41 determines that the external data are input, the routine goes to a step S67 in which the external data input are converted into the internally processible data. That is to say, in a step S67, the control unit 41 converts the external data into the data corresponding to the data format off the fixed limitation data.

If, in a step S65, the control unit 41 does not input the external data, the routine goes to a step S69 in which the fixed limitation data in the storage block 17 is referred to.

In a step S71, the control unit 41 refers to the external data stored in the storage block 17, i.e., the external data added to the fixed limitation data.

In a step S73, the control unit 41 verifies the limitation interval in the direction of the adjacent intersection to the center intersection.

As described above, since the predicted pass time at which the vehicle is to pass through the node is sequentially calculated, it is compared with the previously schemed pass time, and the search for the route of travel with the traffic jam information taken into account is carried out, the most appropriate and assured route of travel can be searched even if one of the road segments having a limitation on a time band during which the vehicle is enabled to pass therethrough.

In addition, since the information from the monitoring block 29 is given to the route searching block 25, the appropriate route search can be made according to the change in the run of the vehicle.

Furthermore, since the new link connecting the center intersection to one of the adjacent intersections is again set on the basis of the stored change history data, the appropriate search for the route of travel can be made in the very short period of time when the processing related to the change in the set route of travel is carried out.

Figure 3:
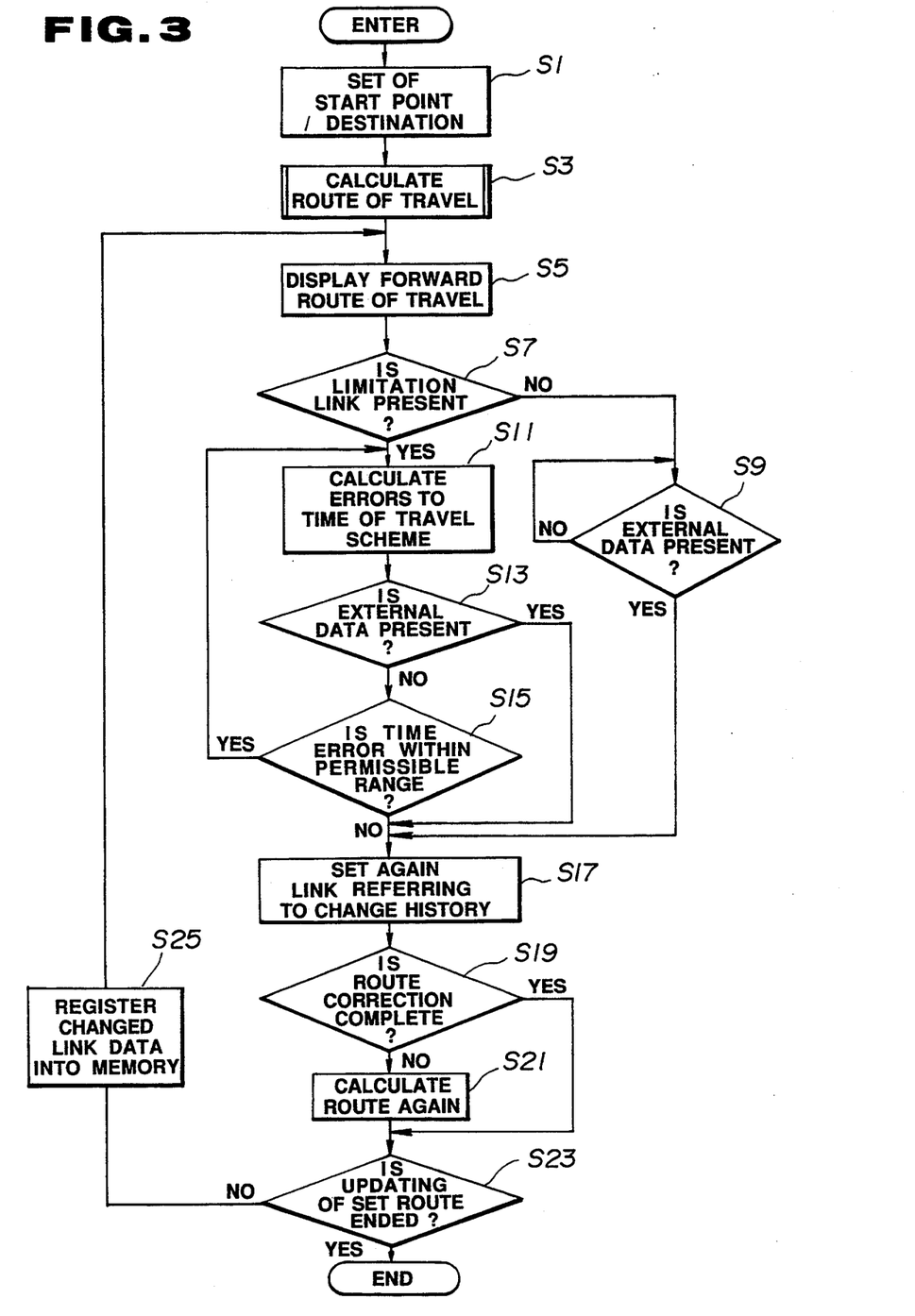
FIG. 3 is an operational flowchart for explaining an operation of the vehicular navigating system in the preferred embodiment shown in FIGS. 1 and 2 according to the present invention.

It is noted that, in the flowchart shown in FIG. 3, the change in the route of travel is carried out when the time error, i.e., the time deviation between the actual pass time and the pass time based on the previously set running scheme is calculated and the change in the route of travel is carried out when the time deviation exceeds the permissible range. However, whenever the predetermined time is passed or when the control unit 41 determines that the vehicle is located in the vicinity to the link subjected to the traffic limitation, the calculation of route of travel is again executed with the present position as the start point so that a quantity of calculations can be reduced.

Figure 4:
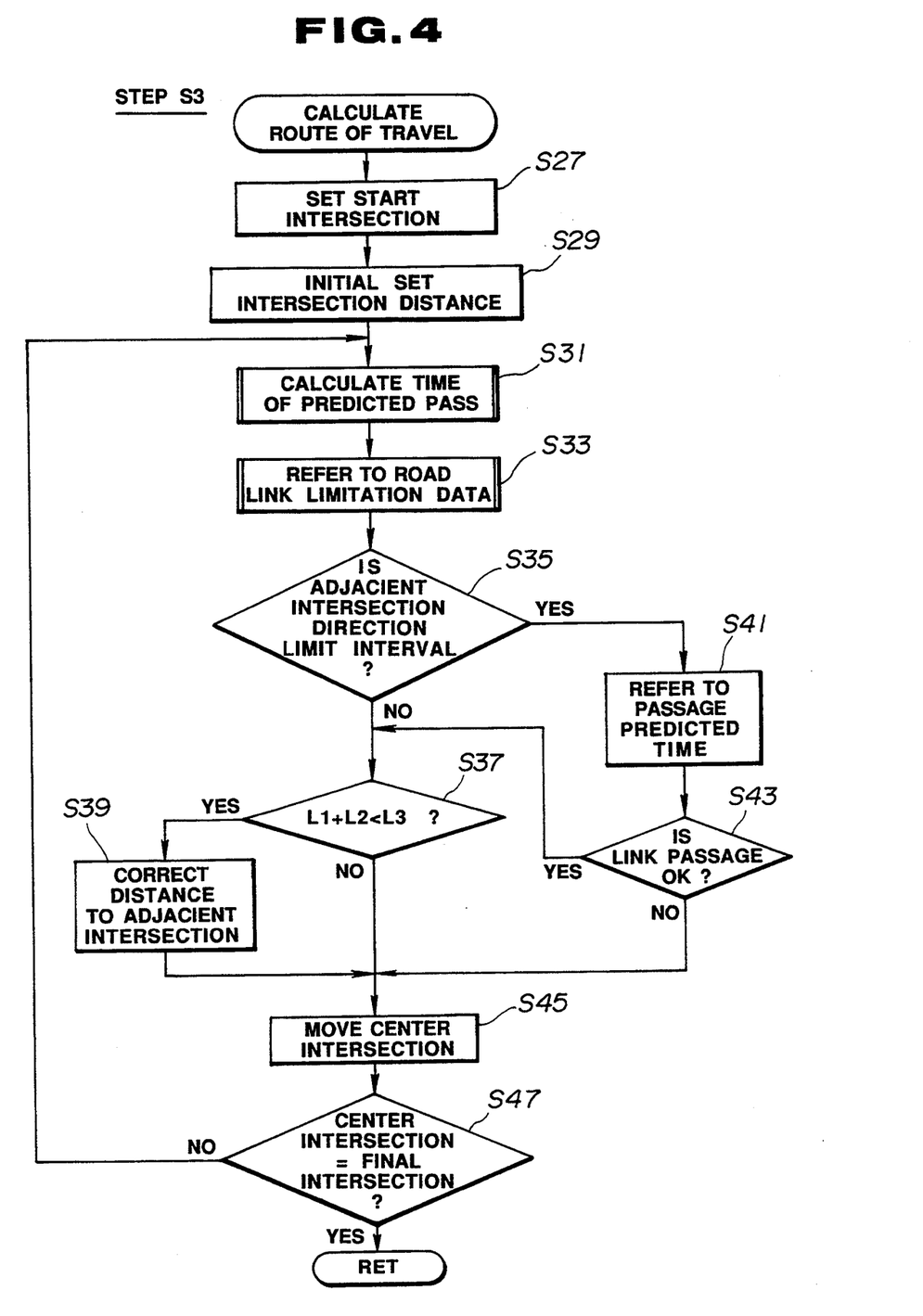
FIG. 4 is an operational flowchart of detailed processing routine of a step S3 shown in FIG. 3.

In addition, although the single route of travel is searched in the example shown in FIG. 4, a priority order is added to a search of the link with a degree of capability of passing through the limited link converted into numeric data so that a plurality of routes can simultaneously be searched.

Figure 5:
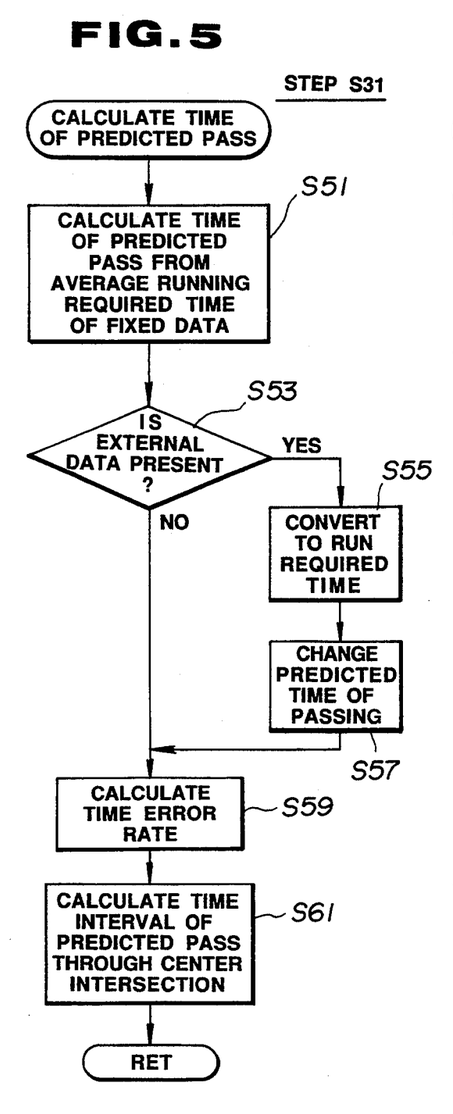
FIG. 5 is an operational flowchart of detailed processing routine in a calculation of predicted time of pass of a step S31 shown in FIG. 4.
Figure 6:
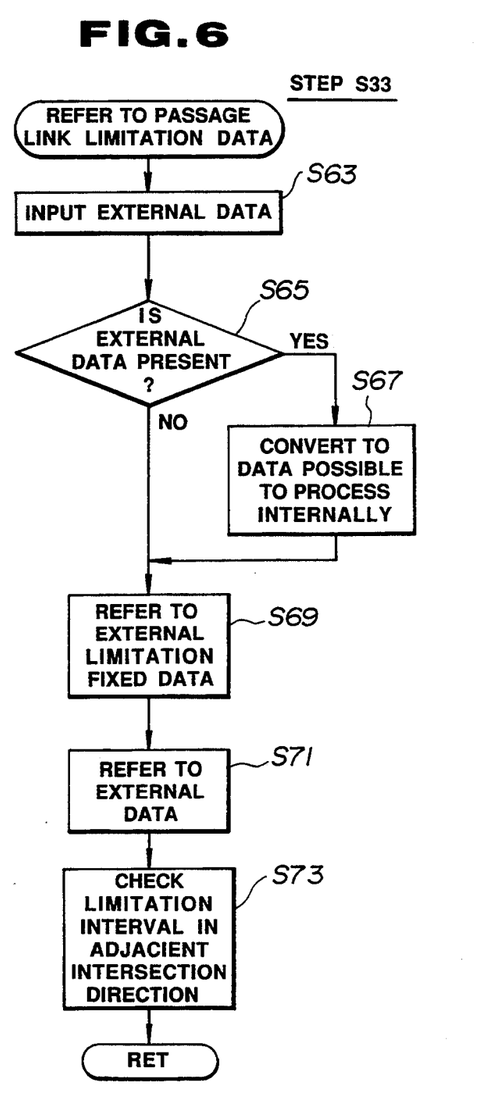
FIG. 6 is an operational flowchart of detailed processing routine in a calculation of predicted time of pass of a step S33 shown in FIG. 4.

Furthermore, although in the flowcharts shown in FIGS. 5 and 6 the search of route referring to the external data is sequentially carried out with the external data input, the search of route can be made by means of the reference to the fixed limitation data even when the input block 19 is unstationary (in an unsteady state).

As described hereinabove, even in a case where a road on which the limitation occurs in a time pass band during which the vehicle can be passed due to each kind of traffic limitation, or in a case where it takes a time for the vehicle to pass through one of the road segments more than the scheduled time due to the traffic jam or temporary traffic limitation, such an external factor is stored into the storage blocks 13, 17 previously or instantaneously so that the most appropriate search of route can be made on the basis of the information stored in the storage blocks 13, 17.

As described hereinabove, since according to the present invention the predicted pass time is calculated for each interval on the basis of the information stored in the storage blocks and the route of travel from the point of start to the destination is set, the search of the optimum route of travel can be made even if any road having the limitation on the time band during which the vehicle is not enabled to pass therethrough is present.

It will fully be appreciated by those skilled in the art that the foregoing description has been made in terms of the preferred embodiment and various changes and modifications may be made without departing from the scope of the present invention which is to be defined by the appended claims.

What is claimed is:

1. A system for determining a route of vehicle travel, comprising:

a) first means having a storage area in which a plurality of routes along which the vehicle can travel from a point of start to a point of destination, said plurality of routes being divided into a plurality of road segments by respective nodes present on said plurality of routes and stored together with a plurality of data representing characteristics inherent to the respective road segments;

b) second means for calculating a predicted time at which the vehicle is to pass through each one of the road segments on a basis of said data on each one of the road segments stored in the first means;

c) third means for setting one of the routes of travel from the point of start to the point of destination according to the result of calculation carried out by said second means, wherein the data stored in the first means includes coordinate data on positions related to intersections placed at midpoints through the plurality of routes, data related to connections of the intersections to adjacent intersections, distance data on links of road segments between adjacent intersections, data related to angles of the links connected to the intersections, data related to required time for the vehicle to run between the adjacent intersections, and road network including the plurality of links, these data including information on kinds of road segments;

fourth means having a second storage area in which various fixed limitation data including limitation data related to one way traffic area, limitation data related to keep off the traffic, and limitation data related to limited traffic passage are stored together with information on a time duration, hours, and day of a week during which the limitation of traffic passage is carried out and wherein and second means calculates the predicted time duration on the basis of information on each one of the road segments stored in the first means and information stored in the fourth means;

fifth means for inputting thereinto time-varying external data including a traffic limitation information, traffic jam information, traffic accident information, road segment information indicating that at least one of the road segments is under construction;

sixth means for combining the external data with the fixed road map data stored in the first means and/or the fixed limitation data stored in the fourth means, and wherein said second means calculates the predicted time duration on the basis of information on each one of the road segments stored in the first means, traffic limitation data stored in said fourth means, and external data derived from the sixth means;

seventh means having operation blocks through which data on the point of start and destination are input and through which a position of the vehicle is to be displayed and wherein said third means reads data on a region of road segments through which the vehicle is to pass from the point of start according to the data derived from said seventh means and searches the region for an optimum route of travel with the predicted time duration calculated by said second means taken into consideration;

eighth means having a third storage area in which data related to the predicted pass time at which the vehicle is to pass through one of the nodes which is placed on the set route of travel searched by said third means is stored;

ninth means having a geomagnetic sensor for detecting a vehicular direction with respect to a geomagnetic North and a distance sensor for detecting a distance by which the vehicle has run and for calculating an instantaneous position of the vehicle on a two-dimensional coordinate system;

tenth means having a control unit and calendar time and which receives a timer information from the calendar timer, data on the position of the vehicle derived from the ninth means, and data related to the predicted time duration for each node derived from said eighth means, stores data related to a time duration previously scheduled and required to reach to the destination, and detects a change in a running condition of the vehicle by comparing the date related to the time duration previously scheduled with the data related to the predicted time duration for each node stored in said eighth means and wherein said third means sets the optimum route of travel according to the detected change in the running condition of the vehicle of said tenth means; and eleventh means having a fourth storage area in which changed history data including data related to a changed link, coded data related to a reason for the change and data related to the predicted time duration during which the vehicle is passed through the changed node is stored whenever the searched route of travel set by said third means is changed.

2. A system for determining a route of vehicle travel as set forth in claim 1, which further includes twelfth means having a display unit and which controls the display of the data related to the set route of travel derived from said third means through the display unit, the display unit displaying the set route of travel, the road map related to the region, and vehicular position of the displayed road map.

3. A method for determining a route of vehicle travel, comprising the steps of:

a) setting a point of start of the vehicle and a destination on a regional road map;

b) searching a plurality of routes through which the vehicle is to pass from the point of start to the destination from a storage area in which the plurality of routes and a plurality of road segments created by dividing said plurality of routes by respective nodes present on the plurality of routes are stored together with a plurality of data representing characteristics inherent to the respective road segments;

c) calculating a predicted time at which the vehicle is to pass from one node to another node through each one of the road segments on the basis of said data stored in the storage area;

d) setting an optimum route of travel from the point of start to the destination according to the result of calculation in the step c);

e) determining whether a limitation link on the set route of travel is present, the limitation link providing a limitation data of passage of a traffic;

f) determining whether an external data related to a traffic jam information is input;

g) calculating an actual passage time at which the vehicle is passing through one of the nodes on the midpoint through the set route of travel;

h) deriving an error between the actual passage time and a predicted passage time at which the vehicle is to pass through the corresponding node calculated on the basis of the predicted time duration in the step b) when the limitation link is present;

i) determining whether the error falls in a permissible range;

j) modifying the set route of travel in the step c) when the error does not fall in the permissible range and/or when the external data is input;

k) setting a start intersection toward which the vehicle is first to run from the point of start and setting a time at which the vehicle is passed through the start intersection;

l) initializing a distance from the vehicle start intersection to a plurality of intersections adjacent to the start intersection;

m) calculating distances from the start intersection to the respective adjacent intersections and times required for the vehicle to run from the start intersection to the respective adjacent intersections on the basis of the information related to the adjacent intersections;

n) calculating the predicted time at which the vehicle is to pass through a center intersection, the center intersection being one of the intersections through which the vehicle is to pass along the set route of travel;

o) determining whether the link on which a traffic passage limitation is provided is present at the midpoint from the center intersection to each one of the intersections adjacent to the center intersection;

p) determining whether a predicted time at which the vehicle is to pass through the link on which the traffic passage limitation is provided falls in a time range during which the traffic passage limitation is carried out on the link;

q) determining whether the following inequality is satisfied when determining that the link on which the traffic passage limitation is carried out is not present and/or determining that the predicted time in the step o) does not fall in the time range, $L1+L2<L3$, wherein L1 denotes a total distance from the start intersection to the center intersection in a shortest course of route from the start intersection, L2 denotes a distance from the center intersection to each one of the adjacent intersections, and L3 denotes a total distance from the start intersection to each one of the intersections adjacent to the center intersection in the shortest course of route from the start intersection;

r) moving the center intersection to another adjacent intersection through which the vehicle is to pass when determining that the following inequality is not satisfied; $L1+L2<L3$ and/or when determining that the predicted time at which the vehicle is to pass through the link falls in the time range during which the traffic passage limitation is carried out; and s) repeating the steps from said step o) to the step r) until the center intersection is moved to a final intersection through which the vehicle is finally pass toward the destination.

4. A method for determining a route of vehicle travel as set forth in claim 3, wherein the step m) comprises the steps of:

t) calculating a predicted time at which one of the links through which the vehicle is to pass referring to an average time required for the vehicle to pass through the link on the basis of the fixed road map and fixed limitation data stored in the step b);

u) determining whether the external data related to the traffic jam information is input;

v) converting the time required for the vehicle to pass through the link when determining that the external data related to the traffic jam information is input;

w) modifying the predicted time calculated in the step s) according to a result of conversion in the step u);

x) calculating a time error rate related to a time series and/or to a total distance from the start intersection to the present position; and y) calculating the predicted time at which the vehicle is to pass through the center intersection.

5. A method for determining a route of vehicle travel as set forth in claim 4, wherein the step o) comprises the steps of:

aa) determining whether the external data through a beacon receiver is input;

bb) converting the external data into an internally processible format of data;

cc) referring to the fixed limitation data stored in the storage area;

dd) referring to the external data added to the fixed limitation data; and ee) verifying a limitation interval of distance in a direction toward each of the intersections adjacent to the center intersection through which the vehicle is to pass.

* * * * *